United States Patent [19]

Derrien

[11] Patent Number: 5,288,037
[45] Date of Patent: Feb. 22, 1994

[54] CATCH DEVICE FOR LOCKING AIRCRAFT LANDING GEAR IN THE RAISED POSITION

[75] Inventor: Michel Derrien, Versailles, France

[73] Assignee: Messier-Bugatti, Velizy Villacoublay, France

[21] Appl. No.: 11,856

[22] Filed: Feb. 1, 1993

[30] Foreign Application Priority Data

Feb. 3, 1992 [FR] France .................. 92 01160

[51] Int. Cl.⁵ .............................. B64C 25/26
[52] U.S. Cl. ...................... 244/102 SL; 294/82.3; 294/82.33
[58] Field of Search ............ 244/102, 102 SL; 294/82.26, 82.3, 82.31, 82.33

[56] References Cited

U.S. PATENT DOCUMENTS

| | | | |
|---|---|---|---|
| 2,567,114 | 9/1951 | Linn | 244/102 SL |
| 3,504,406 | 4/1970 | Schott | 244/102 SL |
| 3,638,887 | 2/1972 | Thurston | 244/102 SL |
| 3,669,387 | 6/1972 | Lucien | 244/102 SL |
| 4,049,222 | 9/1977 | Peterson | 294/82.26 |

FOREIGN PATENT DOCUMENTS

| | | | |
|---|---|---|---|
| 2263699 | 10/1973 | Fed. Rep. of Germany | 294/82.26 |
| 1523401 | 3/1967 | France. | |
| 2161202 | 7/1984 | United Kingdom. | |

*Primary Examiner*—Michael S. Huppert
*Assistant Examiner*—Virna Lissi Ansley
*Attorney, Agent, or Firm*—Sixbey, Friedman, Leedom & Ferguson

[57] ABSTRACT

The invention relates to a catch device of the type comprising a main casing that houses a hinge hook and a locking lever having one branch carrying a thrust wheel that co-operates with the hook and having its other branch connected by means of a linkage to the outlet from a driving motor and gear box assembly. According to the invention, the linkage (112) includes an oblong slot (122) for enabling the locking lever (106) to pivot in the event of the outlet shaft (113) of the motor and gear box assembly being jammed, and, in addition, an independent trigger (130) is associated with the locking lever (106) so that when triggered in an emergency it causes said lever to pivot far enough to disengage thrust wheel (109) from the associated camming surface (110.1) of the hinged hook (102), thereby releasing it.

10 Claims, 1 Drawing Sheet

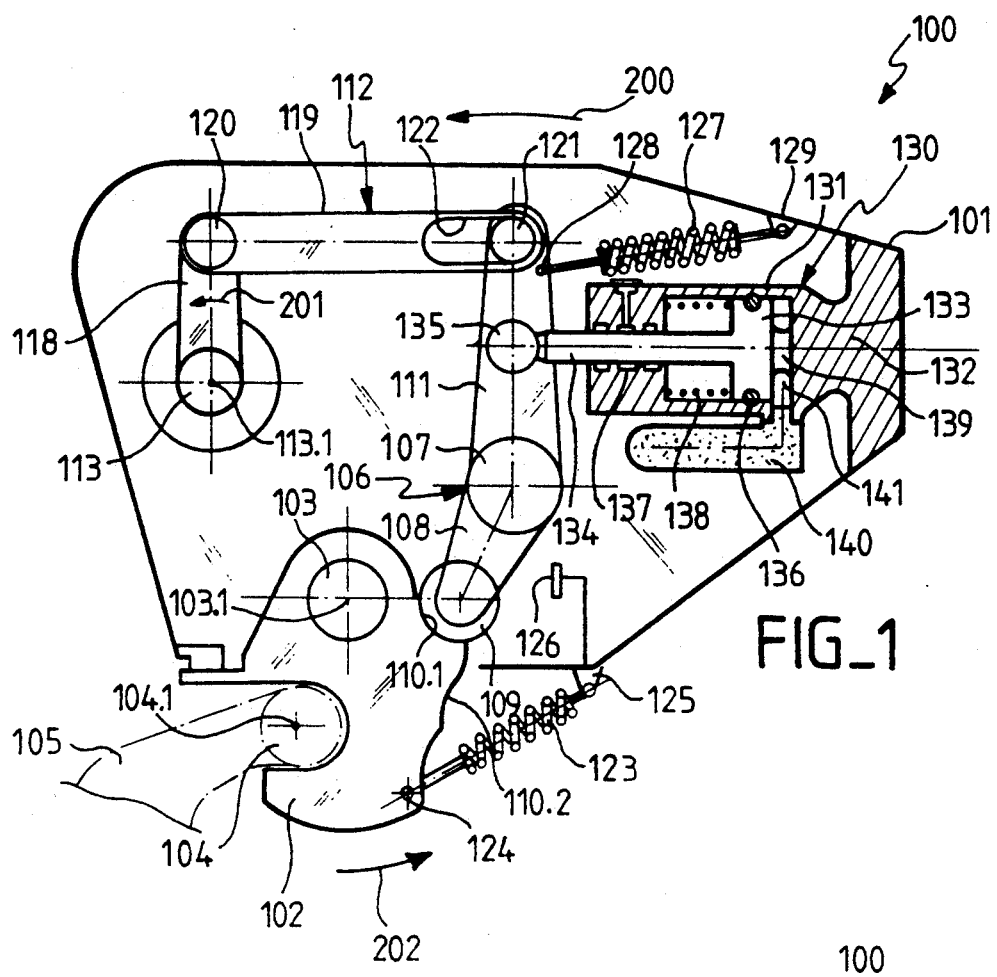
FIG_1
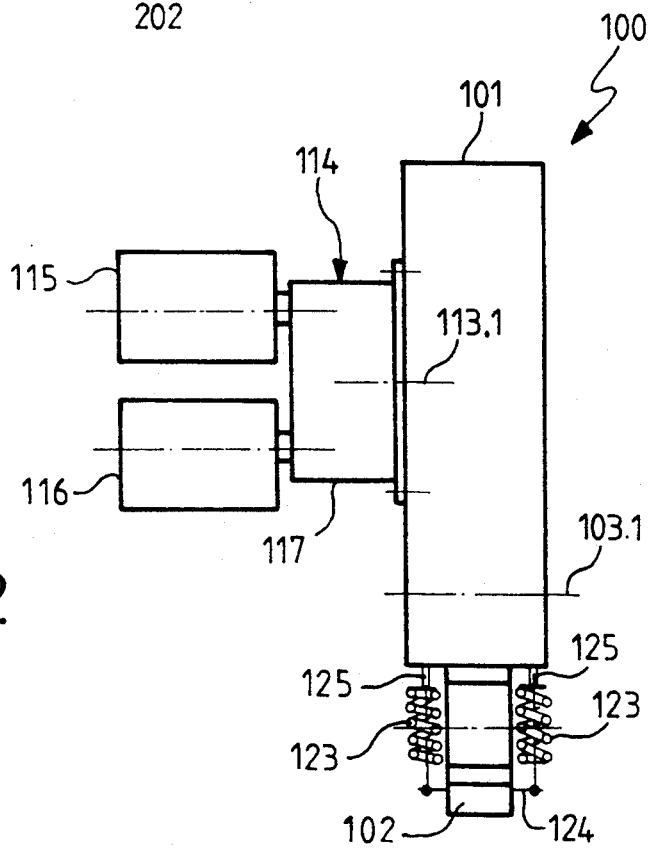
FIG_2

CATCH DEVICE FOR LOCKING AIRCRAFT LANDING GEAR IN THE RAISED POSITION

The invention relates to catch devices, also referred to as "catch boxes", for locking an aircraft landing gear in the high position.

BACKGROUND OF THE INVENTION

Catch devices are already known that comprise a main casing receiving a hook that is hinged about a first axis, and a locking lever that is hinged about a second axis parallel to the first axis, one branch of the lever carrying a thrust wheel that co-operates with a camming surface of the hook, while its other branch is connected via a linkage to the outlet shaft of a driving motor and gear box assembly.

However, catch devices having the above-specified structure are used in emergency only, i.e. they are designed to be operated only in the event of a hydraulic breakdown in the normal unlocking system.

In the search for centralized power generation that is electrical rather than hydraulic, it seems advantageous to use a device of the above-specified type as the normal unlocking system.

However, the person skilled in the art tends to reject such an application because of the risks involved. There is no way of avoiding all risk of mechanical failure in the gear box (tooth breakage, sets of teeth and/or bearings seizing), and the consequences of such risks are extremely severe because if a hinged hook jams, it prevents the corresponding landing gear being lowered.

Although the probability of such a fault is low, the severity of its consequences leads the person skilled in the art to consider emergency mechanisms capable of operating in the event of a breakdown that may be local or general. It should be recalled that the objective in aviation is to limit the breakdown rate to a value of about $10^{-9}$ per hour of operation.

The person skilled in the art could consider fitting the gear box with a differential system, or could consider using two separate gear boxes, however neither of those solutions appears to be entirely satisfactory from the objective point of view, and they also have undesirable effects on mass and bulk.

OBJECTS AND SUMMARY OF THE INVENTION

This is precisely the problem which the invention seeks to resolve by designing a catch device fitted with a safety mechanism capable of ensuring that the hinged hook is unlocked in the event of the gear box jamming or of an electric motor breakdown, and even in the event of a generalized breakdown (loss of auxiliary power generation on the aircraft).

An object of the invention is thus to provide a catch device whose structure makes it possible in the last resort to unlock landing gear in the event of its drive members jamming or in the event of a breakdown that is local or general.

Another object of the invention is to provide a catch device whose structure is both light and compact, and which requires very little energy to be triggered in an emergency.

More particularly, the present invention provides a catch device for locking an aircraft landing gear in the high position, the device comprising a main casing receiving a hook hinged about a first axis and a locking lever hinged about a second axis parallel to said first axis, a first branch of the lever carrying a thrust wheel that co-operates with a camming surface of the hook, and a second branch of the lever being connected via a linkage to the outlet shaft of a driving motor and gear box assembly, wherein the linkage includes an oblong slot at one of its hinged axes in order to make it possible for the locking lever to pivot in the direction for unlocking the hinged hook in the event of the outlet shaft of the motor and gear box assembly jamming, and wherein said catch device further includes an independent trigger associated with the locking lever, suitable for being triggered in an emergency to pivot said locking lever sufficiently to release the thrust wheel from the associated camming surface and to unlock the hinged hook.

Advantageously, the linkage includes a crank constrained to rotate with the outlet shaft of the motor and gear box assembly, and a connecting rod which is hinged to said crank and to the locking lever, said connecting rod having a first oblong slot level with one of its two hinges; resilient return means being provided to urge said locking lever in the direction for locking the hinged hook. In a particular embodiment, the connecting rod has an oblong slot level with its hinge with the locking lever, and the resilient return means is constituted by at least one traction spring connecting said locking lever to the main casing.

Also preferably, the independent trigger is essentially constituted by a piston and cylinder assembly co-operating with the locking lever via the rod of said piston.

It is then advantageous for the independent trigger to co-operates with the second branch of the locking lever by the free end of the piston rod pressing against a wheel carried by said branch, the triggering of said trigger causing said rod to be extended and consequently causing said locking lever to pivot. In particular, the piston includes a flexible rear abutment, and is subjected to the action of a spring tending to hold the rod in the retracted position.

Preferably, the independent trigger is triggered by a gas cartridge: for example it may be constituted by a cartridge containing a powder that releases the propellant gas when ignited by explosive means, or else by a cartridge containing a supply of gas with the propellant gas being released therefrom via an associated valve or cock.

Finally, it is advantageous for the hinged hook to be subjected to the action of at least one return spring tending to rotate it in the unlocking direction, with the hook being kept pressed against the associated wheel carried by the locking lever.

BRIEF DESCRIPTION OF THE DRAWING

Other characteristics and advantages of the invention appear more clearly in the light of the following description and fro the accompanying drawing which relates to a particular embodiment, and in which:

FIG. 1 is a section view through a catch device of the invention with the moving members thereof being shown in the locking position; and FIG. 2 is a side view of the preceding device, clearly showing the associated motor and gear box assembly.

MORE DETAILED DESCRIPTION

FIGS. 1 and 2 show a catch device or catch box 100 in accordance with the invention and intended for locking an aircraft landing gear in the raised position. The catch box 100 comprises a main casing 101 whose bottom receives a hinged hook 102 mounted to rotate about a pin 103. When the landing gear is raised, i.e. in the position shown, the hook 102 locks the landing gear in position via a wheel 104 mounted at the end of an appendix 105 secured to the leg of the landing gear. It should be observed that in this position the axis 104.1 of the wheel 104 is offset relative to the axis 103.1 of the hinge of the hook 102, such that the load exerted by the landing gear exerts a couple tending to rotate the hook in the opening direction. The catch box 100 also includes, likewise within the main casing 101, a locking lever 106 hinged on a second pin 107 parallel to the pin of the hinged hook, the lever having a first branch 108 carrying a thrust wheel 109 that co-operates with a camming surface of the hook 102, and having a second branch 111 which is connected via a linkage 112 to the outlet shaft 113 of a driving motor and gear box assembly 114 (more clearly visible in FIG. 2).

The hinged hook 102 has a camming surface constituted by two portions 110.1 and 110.2, where the portion 110.1 has a radius of curvature identical to the radius of the thrust wheel 109 for the purpose of locking the hinged hook in the position shown. When the locking lever 106 is pivoted in the direction to disengage its thrust wheel 109 (direction shown by arrow 200), the load exerted on the hinged hook 102 by the wheel 104 of the landing gear leg causes the hook to rotate, and causes the landing gear to become unlocked, with the thrust wheel 109 then bearing against the other portion 110.2 of the cam.

FIG. 2 shows the driving motor and gear box assembly 114 which is associated with the catch device 100, said assembly including two electric motors 115 and 116, having their respective outlets associated with a common gear box 117. The outlet shaft of said common gear box is represented by its axis 113.1.

When the motors 115 and 116 are actuated, the outlet shaft 113 rotates in the direction of arrow 201 to cause the locking lever 106 to pivot in the direction that causes its thrust wheel 109 to disengage the associated camming surface 110.1 of the hinged hook 102. This general concept is conventional.

In accordance with an essential aspect of the invention, the linkage 112 has an oblong slot receiving one of its hinge pins, thereby enabling the locking lever 106 to pivot in the direction for unlocking the hinged hook 102 even in the event of the outlet shaft 113 of the motor and gear box assembly 114 being jammed, and the catch device 100 further includes an independent trigger 130 associated with the locking lever 106 and triggered in an emergency to pivot said locking lever sufficiently to release the thrust wheel 109 from the associated camming surface 110.1, thereby unlocking the hinged hook 102.

Thus, in the event of jamming or in the event of a breakdown that is local or generalized, the independent trigger 130 can act directly on the locking lever 106 to enable it to pivot, with said pivoting being made possible by the oblong slot provided in the linkage 112.

In the present invention, the linkage 112 comprises a crank 118 constrained to rotate with the outlet shaft 113 of the motor and gear box assembly 114, and a connecting rod 119 which is hinged to said crank 118 (by a hinge 120) and to the locking lever 106 (by a hinge 121). The connecting rod 119 has an oblong slot 122 at its hinge with the locking lever 106, thereby enabling the hinge pin 121 to slide freely over a predetermined stroke within said oblong slot. Naturally, in a variant, the above-mentioned oblong slot could be provided at the other end of the connecting rod 119, or it could be provided at the end of the crank 118, even though such a disposition would be bulkier than that shown herein. It is advantageous to observe that in the locking position, the oblong slot 122 extends in a direction which is substantially perpendicular to the overall direction of the corresponding branch 111 of the locking lever 106 (in this case along the connecting rod 119), thereby ensuring that emergency pivoting of said locking lever gives rise to minimum friction in the oblong slot 122. In the normal locking position, the hinge 121 is to be found at the end of the oblong slot 122, so that there is no slack in transmission when the driving motor and gear box assembly operates normally to unlock the hinged hook. The length of the oblong slot 122 is naturally designed so that the pivoting of the locking lever 106 is sufficient to release its thrust wheel 109 from the corresponding camming surface 110.1. It would also be possible to provide an abutment 126 secured to the main casing 101 so that in the emergency position no thrust is exerted directly on the control lever and consequently on the jammed outlet shaft of the gear box.

It is then also appropriate to provide resilient return means associated with the locking lever 106 tending to cause said lever to pivot in the direction for locking the hinge hook 102 so as to avoid any risk of untimely disengagement of the wheel 109 from the camming portion 110.1 (it should be observed that the corresponding forces are essentially taken up by the pin 107 of the locking lever, such that the required return couple is relatively small in practice). In this case, the resilient return is provided by at least one (e.g. two) traction springs 127 that connect the locking lever 111 (via a connection point 128 close to the hinge 121 so as to obtain a maximum amount of return torque) to the main casing 101 (via an associated connection tab 129). Furthermore, the hinged hook 102 is itself subjected to the action of at least one return spring tending to pivot it in the unlocking direction: in this case, two traction springs 123 are provided that are connected to the hinged hook 102 via a common rod 124, and that are mounted on the main casing 101 via associated tabs 125. These return springs 123 tend to cause the hinged hook 102 to rotate in the unlocking direction (marked by arrow 202), said springs then acting during rocking of the unlocking lever to release the thrust wheel 109, and also ensuring that good contact is achieved between said wheel and the other camming portion 110.2.

In this case, the independent trigger 130 is implemented in the form of a small actuator comprising a cylinder 131 secured to a spacer 132 of the main casing 101, and having a piston 133 sliding therein with a piston rod 134 suitable for co-operating directly with the locking lever 106.

The independent trigger 130 may be disposed so as to co-operate with one or other of the two branches of the locking lever 106, and in either case, with one or other of the sides of the corresponding branch, the piston rod then acting on the locking lever when said rod is retracted or is extended.

Amongst the above four possible configurations, the configuration shown herein appears to be the most advantageous: co-operation with the branch 111 of the locking lever makes it possible to obtain an assembly which is extremely compact and, in addition, a push rod configuration appears to be preferable insofar as questions of sealing are solved more easily, with sealing of the annular chamber of the small actuator being more difficult to achieve. Thus, the independent trigger 130 co-operates with the second branch 111 of the locking lever by the free end of the rod 134 of the piston 133 bearing against a wheel 135 carried by said branch, with triggering of said trigger causing said rod to be extended, and consequently causing the locking lever to be pivoted in the direction of arrow 200. In normal operation, the piston 133 is held in its rod-retracted position by an associated compression spring 138 received in the cylinder 131, a flexible rear abutment 139 preventing hard contact arising between the wheel 135 and the free end of the rod 134 in the locking position of the lever 106. A groove 137 can also be seen associated with a supply of oil for providing sealing gaskets associated with the piston rod 134 in conventional manner. The rear chamber 141 of the small actuator is further sealed by means of a sliding piston ring 136 carried by the piston 133.

As shown in FIG. 1, the independent trigger 130 is triggered by a gas cartridge 140 which is mounted on the cylinder 131 in such a manner as to communicate directly with the rear chamber 141. The cartridge may contain a powder that releases a propellant gas when ignited by explosive means, or the cartridge may contain a supply of gas with the propellant gas being released therefrom via an associated valve or cock.

The embodiment shown for the independent trigger which is implemented in the form of an explosively triggered small actuator is compatible with a structure that is both lightweight and compact.

Triggering of the independent trigger 130 then requires very little energy. As soon as jamming occurs in the associated control, or in the event of a failure in the auxiliary power generation of the aircraft, the pilot can control the independent trigger from the cockpit, particularly if the trigger is of the explosive type. On being triggered the independent trigger 130 acts instantaneously, via the wheel 135 on the locking lever 106, thereby causing said lever to pivot far enough to release the thrust wheel 109 from the associated camming surface 110.1 and thus unlock the hinge hook 102, with said hook then being fully retracted both by the return springs 123 and by the load exerted on the wheel 104 by the landing gear leg.

The safety system fitted to the catch device of the invention thus makes it possible to cope with jamming or with a breakdown that is local or generalized, thereby enabling the landing gear of an airplane to be unlocked in normal manner, thus allowing the landing gear to be lowered for landing purposes in the last resort. Naturally the device may be used for the same purpose subsequently, and must be reset for that purpose, with the powder or gas cartridge 140 being replaced, however such operations are easily performed in a workshop since the components of the catch device are easily accessible.

The invention is not limited to the above-described embodiment, and on the contrary it extends to any variant that uses equivalent means to reproduce the essential characteristics specified above.

What is claimed is:

1. A catch device for locking an aircraft landing gear in the high position, the device comprising a main casing receiving a hook hinged about a first axis and a locking lever hinged about a second axis parallel to said first axis, a first branch of the lever carrying a thrust wheel that co-operates with a camming surface of the hook, and a second branch of the lever being connected via a linkage to an outlet shaft of a driving motor and gear box assembly, wherein the linkage includes an oblong slot at one of its hinged axes in order to make it possible for the locking lever to pivot in the direction for unlocking the hinged hook in the event of the outlet shaft of the motor and gear box assembly jamming, and wherein said catch device further includes an independent trigger associated with the locking lever, suitable for being triggered in an emergency to pivot said locking lever sufficiently to release the thrust wheel from the associated camming surface and to unlock the hinged hook.

2. A catch device according to claim 1, wherein the linkage includes a crank constrained to rotate with the outlet shaft of the motor and gear box assembly, and a connecting rod which is hinged to said crank and to the locking lever, said connecting rod having a first oblong slot level with one of its two hinges, and wherein resilient return means are provided urging said locking lever in the direction for locking the hinged hook.

3. A catch device according to claim 2, wherein the connecting rod has an oblong slot level with its hinge with the locking lever, and that the resilient return means is constituted by at least one traction spring connecting said locking lever to the main casing.

4. A catch device according to claim 1, wherein the independent trigger is essentially constituted by a piston and cylinder assembly co-operating with the locking lever via the rod of said piston.

5. A catch device according to claim 4, wherein the independent trigger co-operates with the second branch of the locking lever by the free end of the piston rod pressing against a wheel carried by said branch, the triggering of said trigger causing said rod to be extended and consequently causing said locking lever to pivot.

6. A catch device according to claim 5, wherein the piston includes a flexible rear abutment, and is subjected to the action of a spring tending to hold the rod in the retracted position.

7. A catch device according to claim 4, wherein the independent trigger is triggered by a gas cartridge.

8. A catch device according to claim 7, wherein the cartridge contains a powder which releases the propellant gas when ignited by explosive means.

9. A catch device according to claim 7, wherein the cartridge constitutes a supply of gas from which the propellant gas is released via an associated valve or cock.

10. A catch device according to claim 1, wherein the hinged hook is subjected to the action of at least one return spring tending to rotate it in the unlocking direction, with the hook being kept pressed against the associated wheel carried by the locking lever.

* * * * *